United States Patent [19]
Cady

[11] Patent Number: 4,765,358
[45] Date of Patent: Aug. 23, 1988

[54] INFLATION VALVE FOR A DUAL CHAMBER TIRE

[75] Inventor: John M. Cady, Munroe Falls, Ohio

[73] Assignee: The Goodyear Tire & Rubber Company, Akron, Ohio

[21] Appl. No.: 53,195

[22] Filed: May 22, 1987

Related U.S. Application Data

[60] Continuation of Ser. No. 903,874, Sep. 2, 1986, abandoned, which is a division of Ser. No. 856,090, Apr. 28, 1986, abandoned.

[51] Int. Cl.$^4$ ............................................. F16K 15/20
[52] U.S. Cl. .................... 137/223; 152/342.1; 152/427
[58] Field of Search ..................... 137/223, 234.5; 152/341.1, 342.1, 427

[56] References Cited

U.S. PATENT DOCUMENTS

| | | | |
|---|---|---|---|
| 2,241,847 | 5/1941 | Eberhard | 137/223 |
| 2,295,392 | 9/1942 | Eberhard | 137/223 |
| 2,295,457 | 9/1942 | Eberhard | 137/223 |
| 2,549,075 | 4/1951 | Fox | 137/223 |
| 2,991,821 | 7/1961 | Williams | 152/427 |
| 3,480,064 | 11/1969 | Huber | 152/427 X |

*Primary Examiner*—John Rivell
*Attorney, Agent, or Firm*—R J Slattery, III; C Smith

[57] ABSTRACT

A valve (10) for a dual chamber tire comprises a hollow sleeve (15) with at least two ports (21) (22) therein each of which is connected with an inflation chamber. A hollow valve stem (31) is slidably disposed within the sleeve (15). A locking means (50) is capable of holding the stem (31) and sleeve (15) in two different operating positions. An air passageway (35) connects the hollow interior (32) of the stem with the interior (16) of the sleeve (15) and is arranged so that when the stem is locked in one of said two operating positions air can be supplied to two inflation chambers (12,14) simultaneously and when the stem is in the other of said two operating positions one of the inflation chambers (12) is isolated.

3 Claims, 7 Drawing Sheets

INFLATION VALVE FOR A DUAL CHAMBER TIRE

This is a Continuation, of application Ser. No. 903,874 filed on Sept. 2, 1986 of John M. Cady for AN INFLATION VALVE FOR A DUAL CHAMBER TIRE which is a divisional of U.S. application Ser. No. 856,090 filed on Apr. 28, 1986, both of which are now abandoned.

The present invention relates generally to a valve for supplying a gas to two inflation chambers simultaneously. Such valves may be used, for example, with dual chamber safety tires.

Dual chamber safety tires typically comprise a conventional outer tire with a structurally separate inner tire located within the inflation chamber of the outer tire.

In the past separate valves have been proposed for inflating the separate inner and outer tires. This solution is expensive and also requires special tire rims and accessories.

An alternative prior art solution has been to use a single valve for selectively filling or bleeding the inner and outer chambers of a dual chamber tire, but the prior art valves do not easily facilitate the maintenance of equal inflation pressures in two chambers.

The present invention provides a pneumatic valve in which the inflation pressures in the two chambers may be automatically equalized.

Accordingly there is provided a valve for supplying a gas to a plurality of inflation chambers comprising:

a cylindrical sleeve having a coaxial bore therein and at least two ports through said sleeve;

a hollow valve stem having a coaxial bore therein, said stem being located within the sleeve and being axially and concentrically slidable therein for movement relative to the longitudinal axis of the sleeve, said stem having a passageway therethrough capable of allowing the bore in the valve stem to communicate with the bore in the sleeve;

a locking means operable between the stem and the sleeve, said locking means being capable of holding the stem in at least two different operating positions relative to the sleeve;

wherein when said valve stem is locked by said locking mechanism in one of said operating positions the passageway through the stem is in communication with said ports through the sleeve, and when the valve stem is in another of said operating positions at least one of the ports through the sleeve is not in communication with the passageway through the stem.

Preferably, the sleeve has a coaxial stepped through-bore comprising a smaller diameter outer portion in which the valve stem is sealingly slidable, and a larger diameter end portion forming an annular chamber around the stem, and the port for communicating with one inflation chamber is defined by the smaller diameter end portion of the through-bore, and port for communicating with another inflation chamber communicates with the larger diameter end portion of the bore.

The invention will be described with reference to the accompanying drawings in which.

Figure 1:
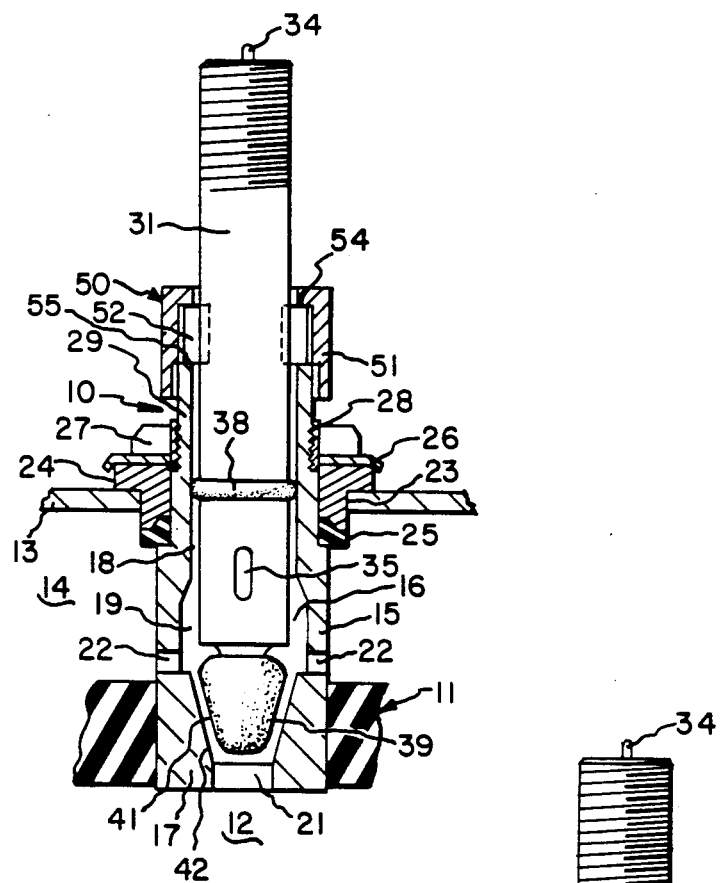
FIG. 1 is a cross-sectional view of a valve according to this invention assembled with a dual chamber tire that is mounted on a rim, showing the valve stem in a first operating position.
Figure 2:
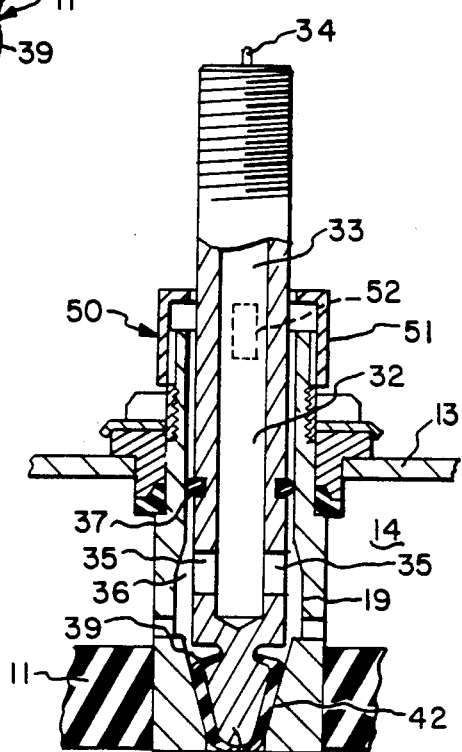
FIG. 2 is a fragmentary cross-sectional view of the assembly of FIG. 1 showing the valve stem in a second operating position.
Figure 3:
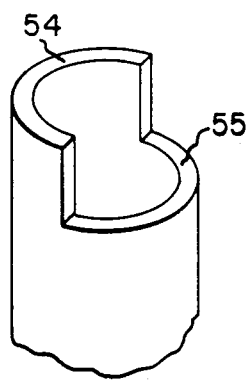
FIG. 3 is a detail of the end of the valve sleeve that is located exterior of the inflation chambers when the valve is assembled with an inflatable article.

With reference to FIGS. 1 to 3, there is illustrated a valve 10 according to the invention assembled with a dual chamber pneumatic tire. In FIG. 1 there is shown a portion of an inner tire or tube 11 which forms an inflation chamber 12. The inner tire or tube 11 is contained within an outer tire casing which is mounted on a rim 13, to form an inflation chamber 14 between the tire casing and the inner tube 11.

The valve 10 comprises a hollow cylindrical sleeve 15 having a through-bore 16 therein. The inner end portion 17 of the sleeve 15 is secured to the inner tire 11 by any suitable method, for example as illustrated in U.S. Pat. No. 3,536,119. The through-bore 16 is a stepped bore comprising a smaller diameter outer portion 18 and a larger diameter inner portion 19, and which at its inner end has a mouth 21 which constitutes a valve port opening into the inner chamber 12. The larger diameter portion 19 of the bore 16 is connected to the outer chamber 14 by a pair of radially extending ports 22, that is radial with respect to the longitudinal axis of the bore 16.

The sleeve 15 which is shown as being secured to the inner tire 11 passes through an opening 23 in the rim 13 and is secured in position by a gasket 24, washers 25 and 26, and a nut 27 which is screwed onto a screw thread 28 on the external surface of the outer end portion 29 of the sleeve 15. However, the exact manner in which the valve is secured to the rim is not considered critical to the invention, and the valve may be secured to the rim by any suitable known means for securing.

A hollow valve stem 31 is located within the sleeve 15 and is sealingly slidable therein for axial and concentric movement relative to the bore 16, (axial refers to the longitudinal axis of the bore and concentric refers to rotational movement relative to the bore). The stem 31 has a blind-bore 32 therein the outer end portion 33 of which will house a conventional valve core 34 (only a portion of which is visible in FIGS. 1 and 2), and the inner end of which is connected by two radial air passageways 35 with an annular chamber 36 formed between the larger diameter portion 19 of the bore 16 and the stem 31.

The sleeves 15 or 15A, 74 and the stem in all embodiments can be made from any suitable material, for example brass or an engineering plastics material such as acetal resin or nylon. The 'O' ring seals 37, 37A, 62, 71, 72 and 73 can be made of a suitable elastomeric material and the seal 39 can be made of a suitable elastomer or perhaps a polytetrafluoroethylese (PTFE) material.

The valve stem 31 has a substantially constant outside diameter along its entire length and is slidable within the smaller diameter portion 18 of the bore 16 in the sleeve 15. An 'O' ring 37 located in a groove 38 in the external surface of the stem 31, acts to form a seal between the stem 31 and the internal surface of the smaller diameter portion 19 of the bore 16. A second seal 39 is fitted onto the inner end portion 41 of the stem and has a frustroconical configuration which can seat on a complementary frustroconical surface 42 adjacent to the mouth 21 of the bore 16.

The valve stem 31 is moveable relative to the sleeve 15 from a first operative position, as shown in FIG. 1, to a second operative position, as shown in FIG. 2. The stem 31 is held in these two different positions by a locking means 50. The locking means 50 comprises a screw thread cap 51 which screws onto the thread 28 on the outer end portion 29 of the sleeve 15, a pair of radially outwardly projecting pins 52 fixed to the stem 31, and abutment surfaces 54 and 55 on the outer end portion 29 of the sleeve 15. The abutment surfaces are shown in detail in FIG. 3 and comprise a first substantially semi-circular abutment surface on the outer end face (54) of the sleeve 15, and a second substantially semi-circular abutment surface 55 adjacent to and set axially inwardly of the first surface 54.

With the valve in an operative position as shown in FIG. 1, one of the pins 52 is in abutment with the outer surface 54 and the cap 51 is tightened to hold the pin 52 against the surface 54 and hence the stem 31 in a first operative position. When the stem 31 is in this position relative to the sleeve 15, air can be fed through the valve core 34 into the bore 32 in the stem 31, and passes via the air passageways 35 into the annular chamber 36 in the bore 16 of the sleeve 15. From the annular chamber 36 air is free to pass via the mouth 21 of through-bore 16 into the inner chamber 12, and via the ports 22 into the outer chamber 14.

When the valve in in its second operative position as shown in FIG. 2, the stem 31 has been rotated through about 90° so that the pins 52 no longer abut the first abutment surface 54 on the sleeve 15, and the stem 31 has been moved axially inwardly so that the seal 39 seats on the frustroconical surface 42 and the pins 52 abut the second abutment surface 55. The cap 52 is then tightened down to hold the pins 52 in abutment with said second abutment surface 55. With the stem 31 in this second operative position the communication between the annular chamber 36 in the bore 16 and the inner chamber 12 is broken and any air through the valve core 34 can pass only to the outer chamber 14.

Therefore a valve according to the present invention when in the first position allows the inner and outer chamber 12 and 14 of the dual chamber tire to be simultaneously filled with air and both inflated to the same required pressure. When the required pressure is reached the valve stem is rotated and moved inwardly to isolate the inner chamber 12 from the outer chamber 14. If a higher inner chamber air pressure is required the outer chamber can be bled down to the required pressure after putting the valve in the second position as described.

Figure 4:
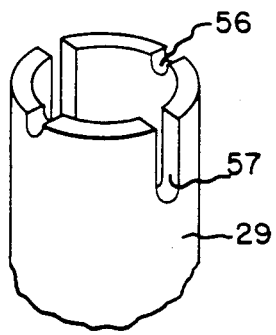
FIG. 4 is a detail of an alternative embodiment of said end of the valve sleeve.

In FIG. 4 there is illustrated an alternative outer end portion of the valve sleeve 15. In this case, when in the first position the pins 52 will rest in two diametrically opposed shallow recesses 56 in the end face of the sleeve 15. This will provide a positive location for the pins 52. Two diametrically opposed axially elongated recesses 57 are also provided in the outer end portion 29 of the sleeve and are arranged to be rotationally offset by 90° from the shallow recess 56. Hence, when the stem 31 is rotated the pins 52 will come into alignment with the slots 57 and the stem can then move axially to cause the seal 39 to seat on the frustro conical surface 42.

Figure 5:
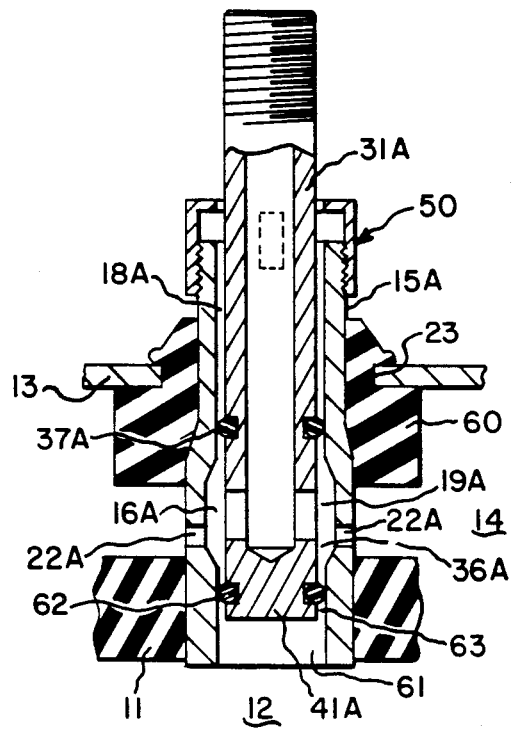
FIG. 5 is a fragmentary cross-sectional view of an assembly having second valve stem in said second operating position.

Now with reference to FIG. 5 there is shown a second valve according to this invention which is essentially similar in construction to the valve of FIG. 1 and only the differences will be described. The valve sleeve 15A is held in position in the aperture 23 in the rim 13 by an annular elastomeric grommet 60 which is snap-fit into the aperture 23.

The sleeve 15A has a through-bore 16A comprising a smaller diameter outer portion 18A, and a larger diameter inner portion 19A which form an annular chamber 36A around the valve stem 31A, and an innermost portion 61 having the same diameter at the outer portion 18A. The stem 31A is of substantially constant diameter and is slidably in the smaller diameter portion 18A and 61 of the through-bore 16A in the sleeve 15A. An 'O' ring seal 37A acts between the stem 31A and the outer portion 18A of the bore 16A, and a second 'O' ring seal 62 is located in an annular groove 63 on the inner end portion 41A of the stem 31A.

The second 'O' ring seal functions in a similar manner to the seal 39 in FIGS. 1 and 2. When the stem 31A has in the first operative position relative to the sleeve 15A, similar to that illustrated in FIG. 1, the seal 62 will be located within the larger diameter inner portion 19A of the bore. With the seal 62 in this position air can freely pass into both the outer chamber 14 via ports 22A, and into the inner chamber 12 via the innermost portion 61 of the through-bore 16A. When the stem 31A is in the second operative position relative to the sleeve 15A, as shown in FIG. 5 and similar to that shown in FIG. 2, the seal 62 is located between the stem 31A and the innermost portion 61 of the bore 16A to prevent air flow into the inner chamber 12.

Figure 6:
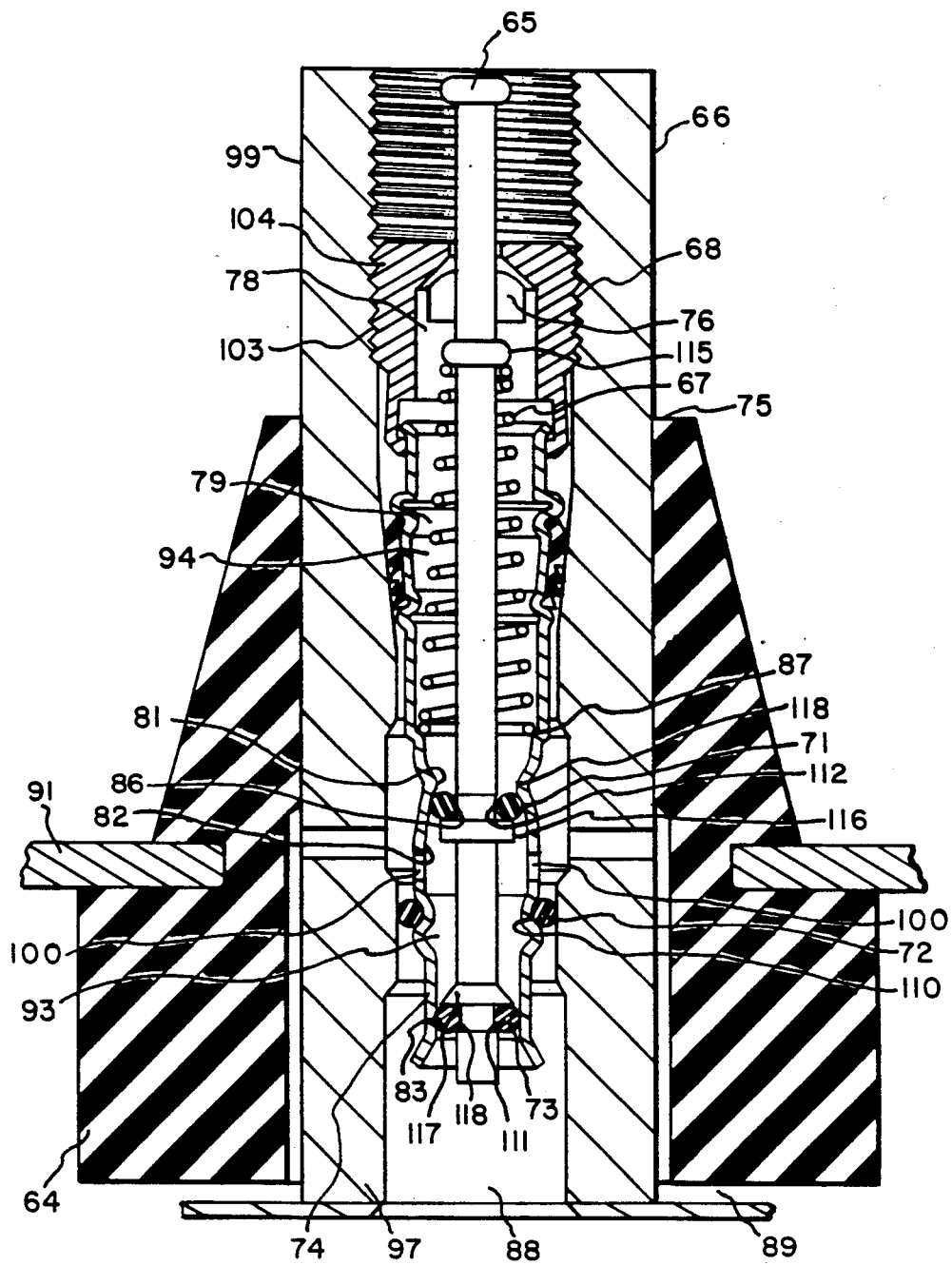
FIG. 6 is a cross-sectional of a valve assembly which is completely encased and shown secured to a rim. The valve is shown in the closed position.
Figure 7:
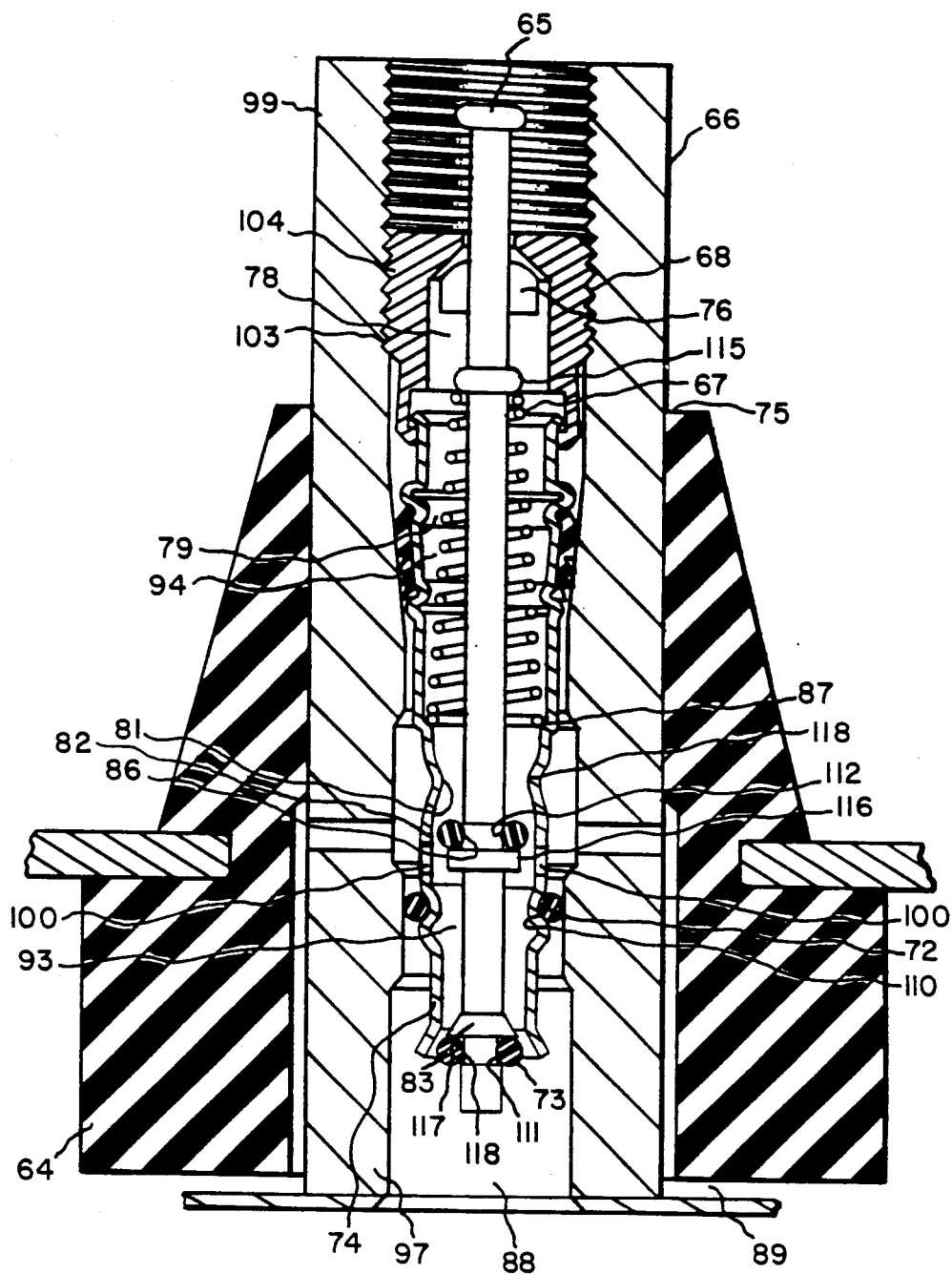
FIG. 7 is the valve as shown in FIG. 6 in the opened position.
Figure 8:
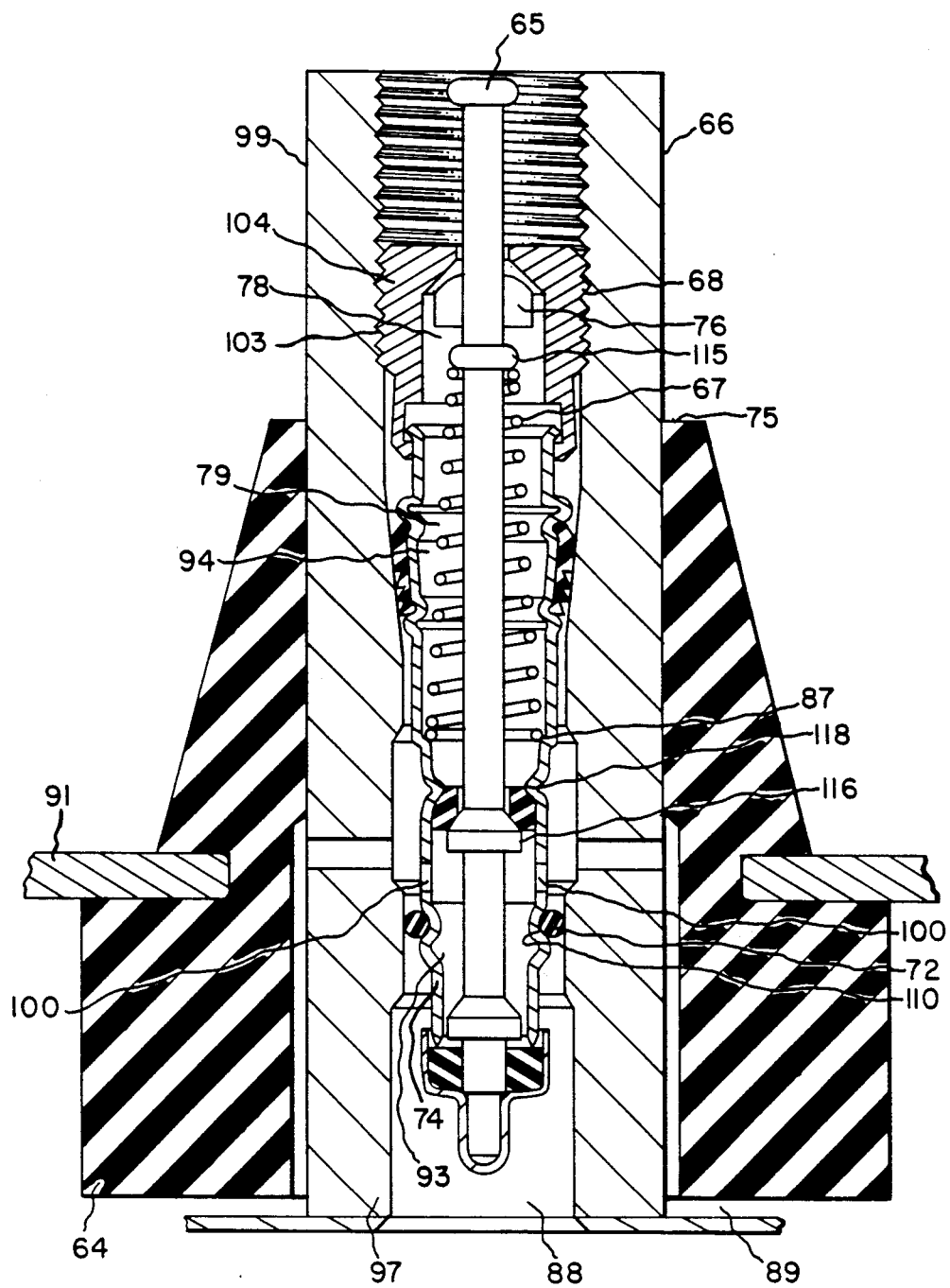
FIG. 8 is the valve as shown in FIG. 7 but also showing the seat provided for the stem with the valve shown in the closed position.

Now with reference to FIGS. 6–8 is shown a third valve according to this invention which is similar in construction to the valves of FIGS. 1 and 2. In FIG. 6 there is shown a valve assembly for use with a tubeless tire within an outer tire casing which is mounted on a lining, to form an inflation chamber 93 between the tire casing and the rim 91.

The valve 99 comprises a hollow cylindrical stem 66 having a through-bore therein. The inner portion 97 is secured to the rim 91 by any suitable method.

A hollow sleeve is located within the stem having a through bore therein. The through-bore is a stepped bore comprising a smaller diameter inner portion 81 and larger diameter outer portion 82. The larger diameter outer portion 82 of the bore is connected to the outer chamber by a radially extending port 100 that is radial with respect to the bore 94 and has an opening 101 that is axial with respect to the bore 94. The sleeve 74 is sealingly slidable within the stem 66 for axial and concentric movement relative to the bore 94, (axial refers to the longitudinal axis of the bore and concentric refers to rotational movement relative to the bore). The stem 66 has a blind bore 104 therein mounted within the stem 66, it is a conventional valve core 65, and the inner end of which is connected by two radial air passageways 100, 101 with an annular chamber 79 forming a larger diameter portion 82 of the bore and the sleeve 74.

The valve stem 66 has a substantial outside diameter along its entire length and is slidable within the inside bore of a rim grommet 64. The rim grommet 64 is made of an elastomeric material and designed to engage the rim in place and hold the valve securely on the rim. An O ring 72 located in a grove 110 on the external surface of the sleeve 74 acts to form a seal between the sleeve 74 and on the internal surface of the smaller diameter portion of the stem 66.

The valve core pin 65 has mounted on its external surface a spring which engages a radially protruding notch 115 on the core pin and a groove 87 on the inside diameter of the sleeve 74. The core pin has two other radially extending notches 116 having an O ring 71 engaging the groove 118 of the notch 116 and the inside diameter of the sleeve forming a seal. The second notch 117 on the pin 65 forms a second seal with the O ring 73 and the groove on the radially extending notch 117.

Figure 9:
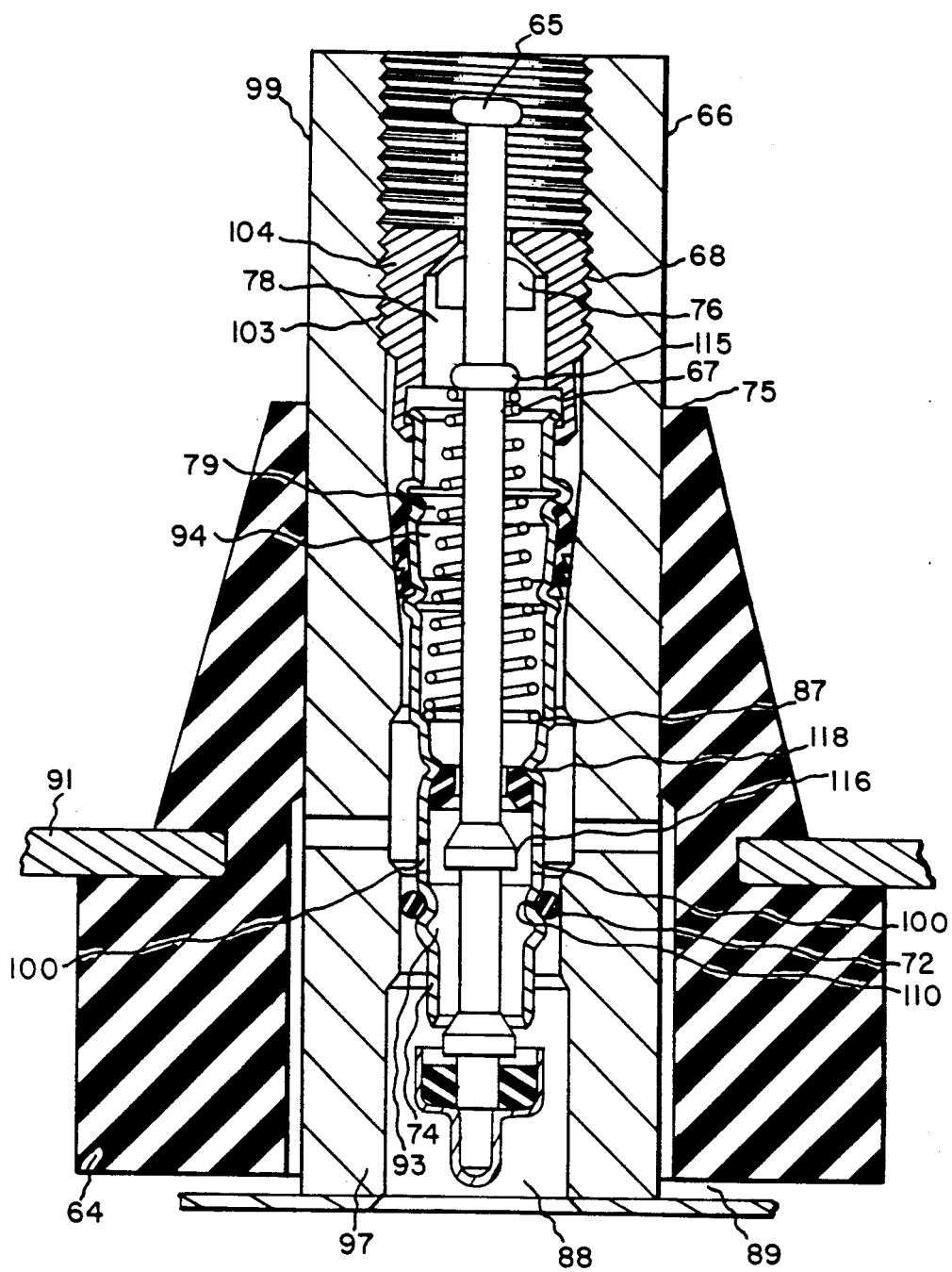
FIG. 9 is the valve as shown in FIG. 8, with the valve shown in the opened position.

The valve core pin is moveable relative to the stem from a first operative position, as shown in FIGS. 6 and 8, to a second operative position, as shown in FIGS. 7 and 9. The spring abuts against the notch 115 on the valve core pin and the inner diameter of the sleeve to move the valve core pin from the first position as shown in FIGS. 6 and 8 to the second position as shown in FIGS. 7 and 9. When the valve core pin is pushed to the second position the spring is compressed, released and it moves back to the first position when pressure is removed from the valve core pin while traveling in an axial direction. When the valve core pin is in the second position the inner and outer chamber communicates until the air pressure is equal. In the second position as shown in FIGS. 7 and 9 air travels into the chambers past the valve core pin as it is being supplied through the stem. Once the two chambers have been filled with the appropriate amount of air, the valve core is moved to the first position while the two chambers are isolated from each other, the spring expands the maximum distance permitted by the cavity in the rough bore while engaging between the notch of the valve core and the inside diameter of the sleeve.

Therefore, a valve according to the present invention when in the first position allows the inner and outer chamber of the dual chamber tire to be simultaneously filled with air while both chambers are inflated to the same pressure. When the required pressure reaches the valve core, it moves outwardly as shown in FIGS. 6 and 8 (the first position) to isolate the inner chamber from the outer chamber. When the valve core is in the first position the opening for the air is sealed off by the lower portion of the sleeve which engages an O ring 71 which provides a seal to isolate the two chambers. In FIGS. 6 and 8 a second seal is also provided whereby either an elastomeric O ring or plastic piece of material abuts against the radial extending portion of the valve core 65 prevent the air from escaping through the sleeve and past the valve core 65 from the outer chamber 94.

Figure 10:
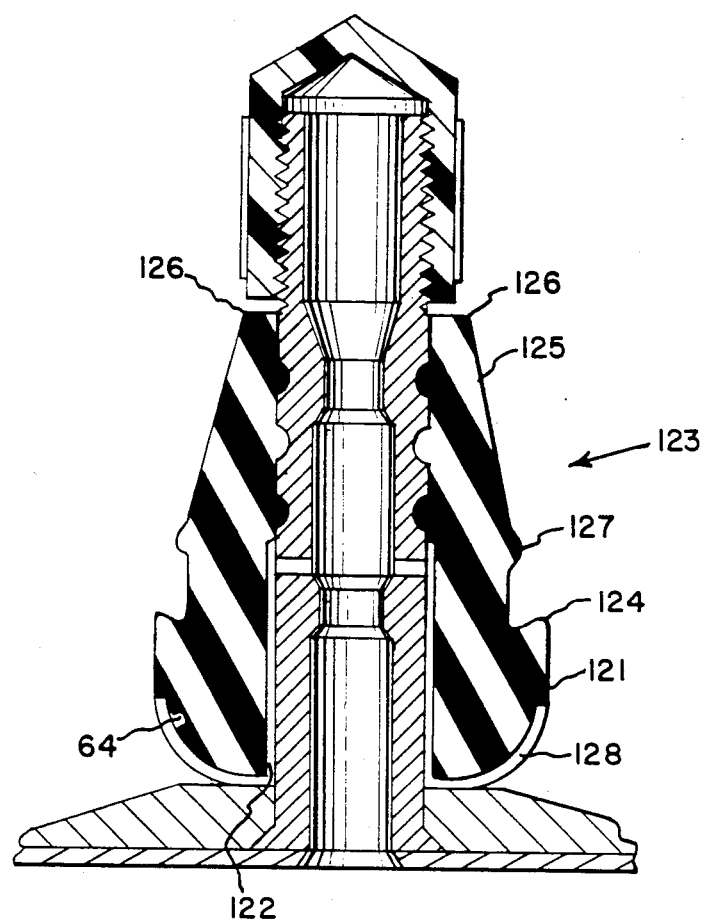
FIG. 10 shows a rim grommet which is shown inserted in a rim face.

A further embodiment of applicant's invention is shown in FIG. 10. FIG. 10 shows a rim grommet 64 which when used is inserted over the outside diameter of the valve as shown in FIG. 6. The grommet 64 fits snugly over the valve and is inserted through a hole provided in the rim. The grommet is preferred to be made of an elastomeric material. The grommet has a through-bore with varying diameters on its outside surface 123. The outside diameter on its lower portion has a lip that protrudes past the other diameters on the outside surface 123. The upper portion 125 of the grommet 64 is sloped with its smallest diameter 126 at the top portion of the grommet. The mid-section of the grommet has an additional notch 127 above the lip 124 at the lower portion of the grommet. When inserting the grommet into the hole in the rim, the smallest diameter 126 is smaller than the hole in the rim, and it slides through the grommet and then travels through the hole until the notch 127 catches the outside perimeter of the hole in the rim. The notch 127 of the grommet is then forced into the hole or the rim with additional pressure being applied axially to the opening in the grommet. Once the notch 127 of the grommet snaps past the opening in the rim, the lip 124 of the grommet abuts against the rim and holds the valve and grommet snugly in place. The lip's 124 outside perimeter 120 abuts snugly against the face of the rim where the hole is located.

While certain representative embodiments and details have been shown for the purpose of illustrating the invention, it will be apparent to those skilled in this art that various changes and modifications may be made therein without departing from the spirit or scope of the invention.

What is claimed is:

1. In a tire assembly having a dual chamber pneumatic tire mounted upon a rim, said dual chamber pneumatic tire having an inner tire forming a first inflation chamber and an outer tire forming a second inflation chamber with the inner tire; a pneumatic valve comprising:

- a sleeve, carried by said rim and having a first end, body and a second end, the second end carried only by said inner tire, said sleeve defining a stepped bore comprising a smaller diameter portion extending from said first end to a larger diameter portion which in turn extends to an opening in the second end which communicates directly with said first inflation chamber, and said body having an opening located between said rim and said inner tube communicating with said second inflation chamber and an air passage extending radially from said larger diameter portion to said body opening;
- a hollow valve stem, disposed within and extending from said stepped bore, capable of slidable and rotational movement therein from a first to a second portion, having a blind-bore therein and an air passageway therein for connecting pneumatically the bore of the hollow valve stem with the larger diameter portion of the stepped-bore of said sleeve;
- a valve core means disposed within an open end of said hollow valve stem for controlling the passage of air to said hollow valve stem;
- a first seal means attached to another end of said hollow valve stem for mating with said opening in the second end of said sleeve and thereby preventing air passage from said stepped bore to said first inflation chamber when said hollow valve stem is in said first portion and axially disposed a predetermined distance from said opening in the second end of said sleeve when said hollow valve stem is in said second position;
- a locking means operable between the hollow valve stem and the sleeve for holding the stem selectively in one of the two positions;

wherein when said hollow valve stem is in said first position the first and second inflation chambers are pneumatically isolated from one another and the air passageway is in pneumatic communication only with the opening in the body of the sleeve and said second inflation chamber; and wherein when said hollow valve stem is in said second position the air passage way is in pneumatic communication with both openings in said sleeve and said both inflation chambers.

2. The pneumatic valve of claim 1 wherein said locking means comprises a first abutment surface and a second abutment surface each located on a portion of an end face of the first end of said sleeve, the second abutment surface being rotationally offset, and axially inwardly from the first abutment surface;

a radially projecting abutment carried by the hollow valve stem and being in contact with one or the other abutment surfaces; and a means for preventing the axial movement of said stem once said position has been determined.

3. The pneumatic valve of claim 2 further comprising a second sealing means disposed between said hollow valve stem and said smaller diameter portion of said stepped-bore for preventing leakage of air;

wherein the opening in the second end of said sleeve has a frusto-conical surface adjacent thereto;

said first seal means having a complementary frusto-conical surface; and said means for preventing axial movement of said stem comprising a screw thread cap having an aperture therein and threads for screwing onto threads located on the first end of said sleeve.

* * * * *